(12) United States Patent
Murakami

(10) Patent No.: US 8,826,380 B2
(45) Date of Patent: Sep. 2, 2014

(54) PROXY SERVER, CONTROL METHOD THEREOF, CONTENT SERVER, AND CONTROL METHOD THEREOF

(75) Inventor: Shingo Murakami, Kanagawa (JP)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 147 days.

(21) Appl. No.: 13/144,786

(22) PCT Filed: Jan. 16, 2009

(86) PCT No.: PCT/JP2009/051024
§ 371 (c)(1),
(2), (4) Date: Jul. 15, 2011

(87) PCT Pub. No.: WO2010/082362
PCT Pub. Date: Jul. 22, 2010

(65) Prior Publication Data
US 2011/0277015 A1 Nov. 10, 2011

(51) Int. Cl.
*G06F 21/00* (2013.01)
*G06F 15/16* (2006.01)

(52) U.S. Cl.
USPC .............................................. 726/3

(58) Field of Classification Search
USPC ................................ 726/3; 709/217
See application file for complete search history.

(56) References Cited

U.S. PATENT DOCUMENTS

| | | | |
|---|---|---|---|
| 5,706,507 A * | 1/1998 | Schloss | 709/225 |
| 2004/0117370 A1 * | 6/2004 | Dutta et al. | 707/9 |
| 2005/0276576 A1 * | 12/2005 | Sako et al. | 386/94 |
| 2007/0234041 A1 * | 10/2007 | Lakshmeshwar et al. | 713/156 |
| 2007/0294254 A1 * | 12/2007 | Yao | 707/10 |
| 2009/0182843 A1 * | 7/2009 | Hluchyj et al. | 709/219 |
| 2009/0183211 A1 | 7/2009 | Yan et al. | |

FOREIGN PATENT DOCUMENTS

| | | |
|---|---|---|
| EP | 1978707 A1 | 10/2008 |
| EP | 2000915 A2 | 12/2008 |
| JP | 11355268 A | 12/1999 |
| JP | 2006031522 A | 2/2006 |
| WO | 03/088059 A1 | 10/2003 |
| WO | 2007/087749 A1 | 8/2007 |
| WO | 2007/105460 A1 | 9/2007 |
| WO | 2008037215 A1 | 4/2008 |

OTHER PUBLICATIONS

Open Mobile Alliance, "DRM Architecture", Approved version 2.1, Oct. 14, 2008, pp. 1-28, retrieved on Apr. 25, 2014, retrieved from internet: technical.openmobilealliance.org.

(Continued)

*Primary Examiner* — Jeffrey Pwu
*Assistant Examiner* — Samuel Ambaye
(74) *Attorney, Agent, or Firm* — Coats & Bennett, PLLC

(57) ABSTRACT

The present invention particularly relates, but is not limited to, a technology that facilitates the identification of a consumed content item and a user who consumed that item, and there is provided a proxy server that is capable of communicating with a client and a content server storing content for which permission data is required for reproduction. The proxy server comprises, in particular, a content information retrieving unit that retrieves, from the content server, content information that identifies the content server and the content, and a generating unit that generates modified content information that identifies the proxy server and the content identified by the content information.

24 Claims, 7 Drawing Sheets

(56) References Cited

OTHER PUBLICATIONS

Kim, H., et al., "Digital Rights Management with Right Delegation for Home Networks", Information Security and Cryptology—ICISC 2006, Proceedings of 9th International Conference, Busan, Korea, Nov. 30, 2006, pp. 233-245, Lecture Notes in Computer Science Vol. 429.

Open Mobile Alliance, "DRM Specification", Draft Version 2.1, Jul. 4, 2008, pp. 1-245, US.

* cited by examiner

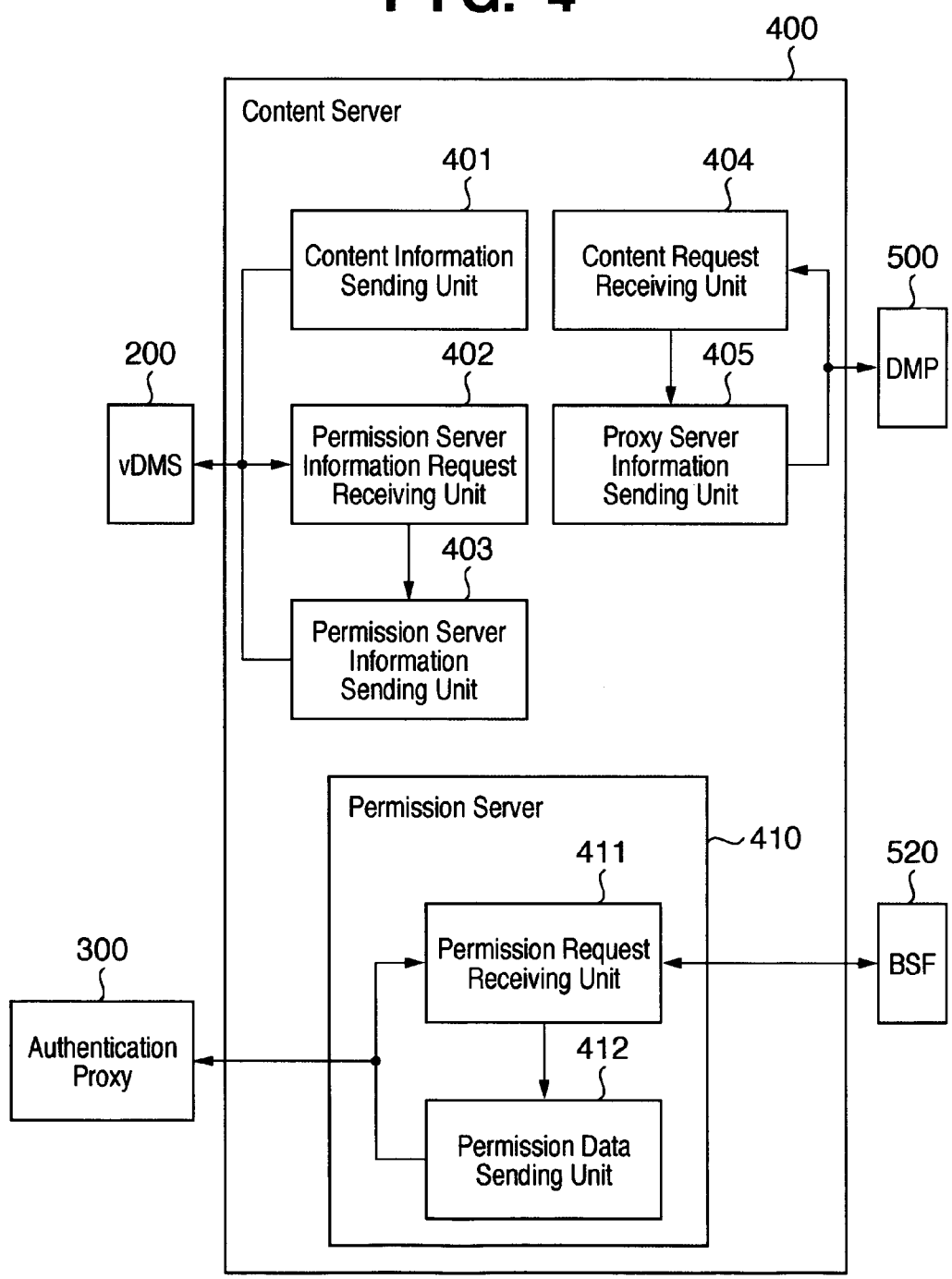

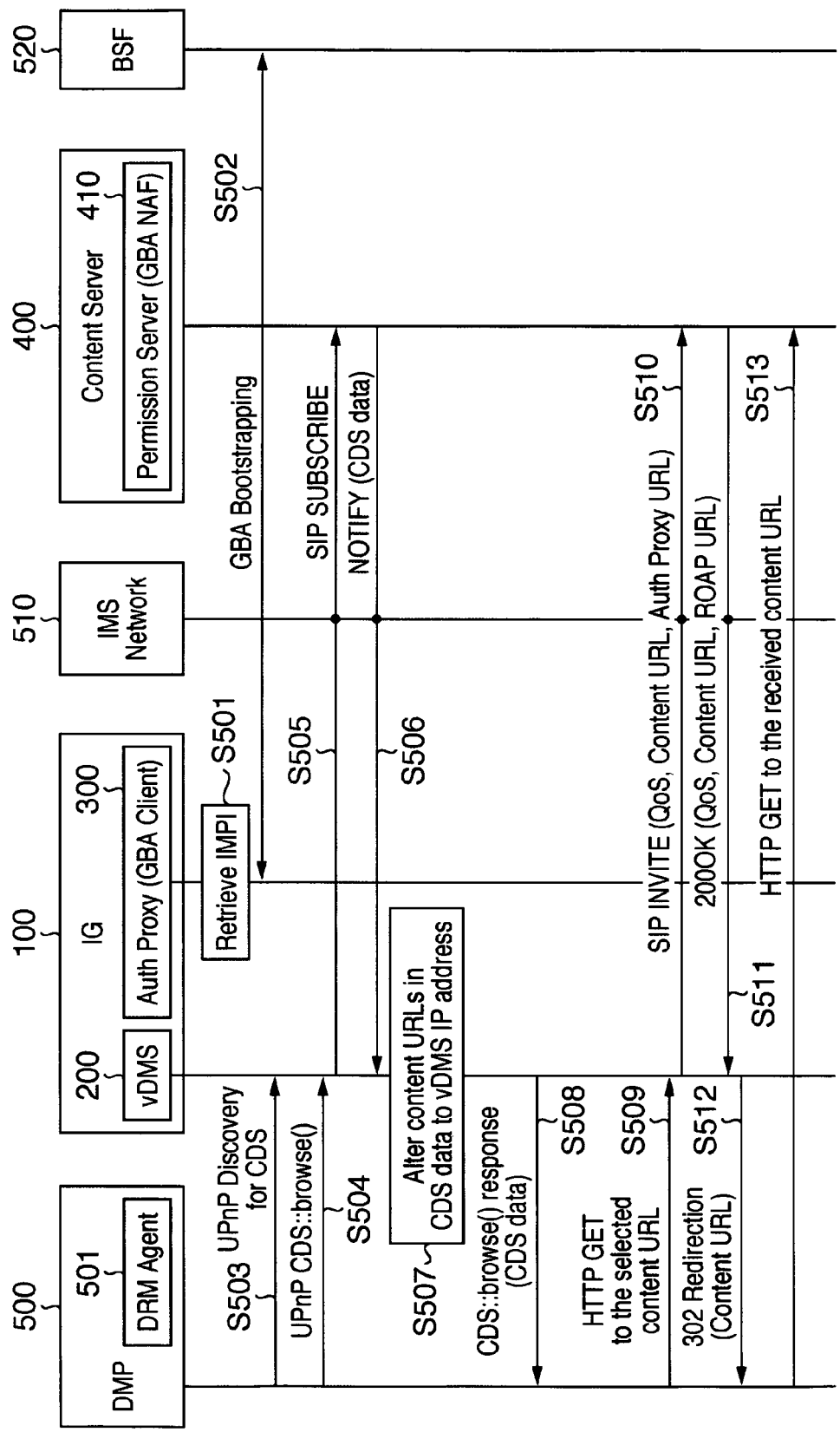

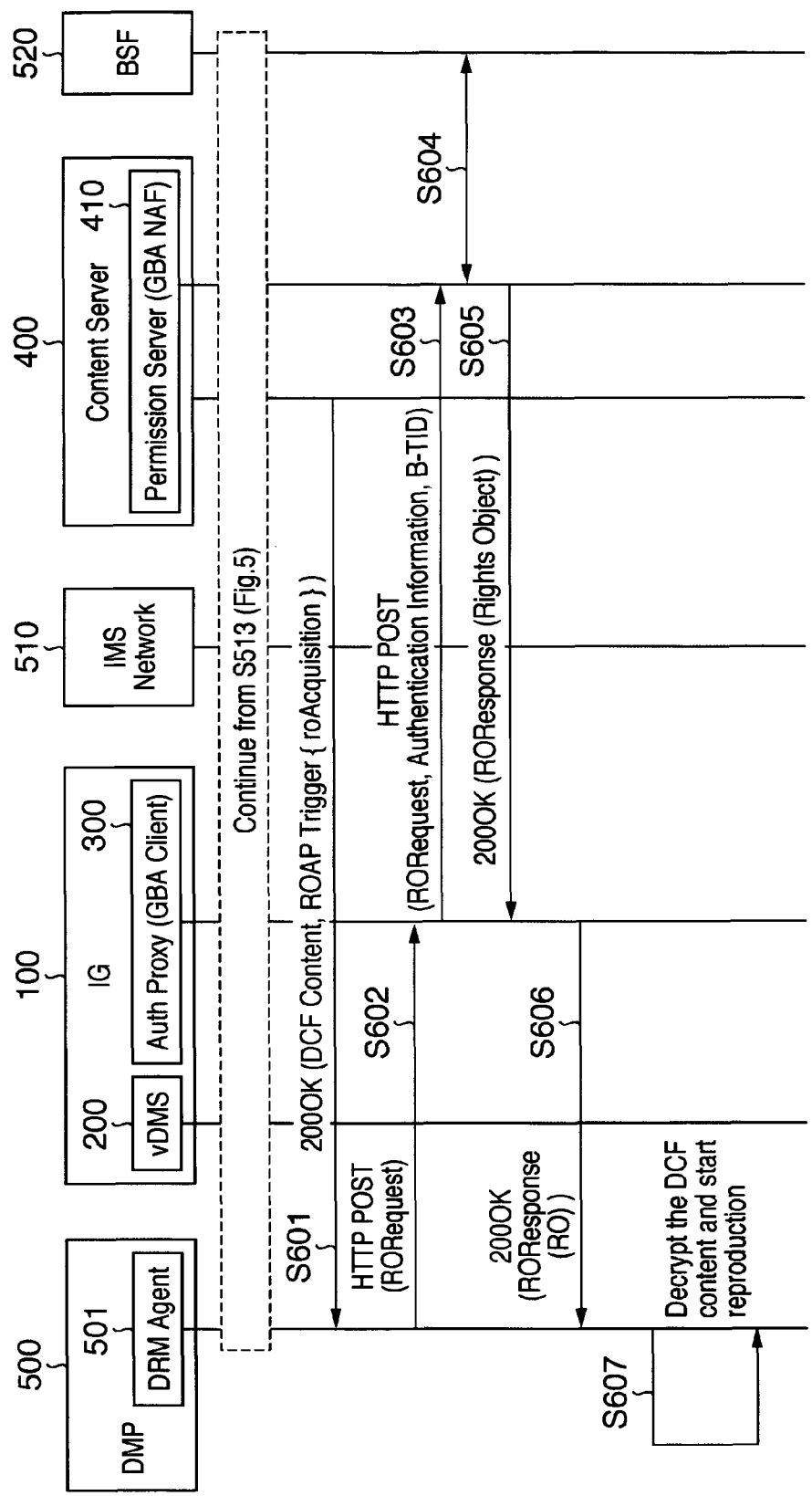

F I G. 7

```
<complexType name="ROAcquisitionTrigger">
 <sequence>
  <element name="riID" type="roap:Identifier"/>
  <element name="riAlias" type="string" minOccurs="0"/>
  <element name="nonce" type="roap:Nonce" minOccurs="0"/>
  <element name="roapURL" type="anyURI"/>
  <element name="domainID" type="roap:DomainIdentifier" minOccurs="0"/>
  <element name="domainAlias" type="string" minOccurs="0"/>
  <sequence maxOccurs="unbounded">
   <element name="roID" type="ID"/>
   <element name="roAlias" type="string" minOccurs="0"/>
   <element name="contentID" type="anyURI" minOccurs="0" maxOccurs="unbounded"/>
  </sequence>
 </sequence>
 <attribute name="id" type="ID"/>
</complexType>
```

PROXY SERVER, CONTROL METHOD THEREOF, CONTENT SERVER, AND CONTROL METHOD THEREOF

TECHNICAL FIELD

The present invention generally relates to a proxy server, a method for controlling the proxy server, a content server, and a method for controlling the content server. The present invention particularly relates, but is not limited to, a technology that facilitates the identification of a consumed content item and a user who consumed that item.

BACKGROUND

Currently, a so-called "virtual Digital Media Server (vDMS)" is known. One of the examples of the vDMS is TVersity Media Server, information about which may be found at http://tversity.com/. The vDMS is located between a content server and a Universal Plug and Play (UPnP)-enabled Digital Media Player (DMP), and provides the UPnP-enabled DMP with a UPnP Content Directory Service (CDS) regarding the content server. In other words, the UPnP-enabled DMP can obtain a content list of a content server via the vDMS.

In addition, an IP Multimedia Subsystem (IMS) Gateway (IG), which is a kind of a User Equipment (UE), is known. The IG works as a Session Initiation Protocol (SIP) Back-to-back User Agent (B2BUA) and provides IMS-incapable devices (e.g., DMPs) with IMS connections. A basic configuration of an IG is proposed in, for example, WO 2006/045706.

If the vDMS cooperates with the IG, the vDMS can provide a DMP with a content list of a content server via an IMS network. In other words, a combination of the vDMS and the IG enables the DMP to obtain the content list of the content server via the IMS network. In this scenario, a DMP first obtains a content list of a content server via the vDMS. When a certain content item is selected from the content list by a user, the DMP sends an HTTP GET message to the content server storing the selected content item in order to retrieve it. It should be noted that the HTTP GET message and the selected content item are exchanged between the DMP and the content server without going through the vDMS and the IMS network.

Recently, content stored by a content server is often protected by means of a Digital Rights Management (DRM) technology such as Open Mobile Alliance (OMA) DRM 2.0. In the case of OMA DRM 2.0, a DMP receives a content item in the form of DRM Content Format (DCF). If the DMP receives a DCF content item, it acquires from a Rights Issuer a Rights Object (RO), which enables reproduction of the DCF content item, by means of OMA DRM Rights Object Acquisition Protocol (ROAP). When an RO is requested, the Rights Issuer authenticates the DMP based on the DMP's device certificate. Similar to the case of a content item, an RO is sent from a Rights Issuer to a DMP without going through the vDMS and the IMS network.

Content providers often require the charging of a user of a DMP for consumption (typically, reproduction) of content. In particular, content providers often require that an IMS operator carry out charging on their behalf because the IMS operator usually has information regarding the user, which is sufficient to facilitate charging.

However, because content items and ROs are received by a DMP without going through the vDMS and the IMS network as described above, it is quite difficult or impossible for the IMS operator to identify who consumed a given content item. Consequently, it is impossible for content providers to efficiently and appropriately charge users.

SUMMARY

The present invention is intended to address the above-described problem, and it is a feature thereof to introduce a technology that facilitates the identification of a consumed content item and a user who consumed that item.

According to a first aspect of the present invention, there is provided a proxy server that is capable of communicating with a client and a content server storing content for which permission data is required for reproduction, the proxy server comprising:

a content information retrieving unit that retrieves, from the content server, content information that identifies the content server and the content;

a generating unit that generates modified content information that identifies the proxy server and the content identified by the content information;

a modified content information sending unit that sends the modified content information to the client;

a content request receiving unit that receives, from the client, a request for the content identified by the modified content information;

a permission server information retrieving unit that retrieves, from the content server identified by the content information identifying the requested content, permission server information that identifies a permission server capable of creating the permission data for the requested content, wherein the permission server information retrieving unit sends, to the content server, proxy server information that identifies the proxy server;

a content information sending unit that sends the content information to the client as a response to the request for the content;

a permission request receiving unit that receives, from the client, a request for the permission data for the requested content;

a permission data retrieving unit that retrieves the requested permission data from the permission server; and a permission data sending unit that sends the requested permission data to the client as a response to the request for the permission data.

According to a second aspect of the present invention, there is provided a method for controlling a proxy server that is capable of communicating with a client and a content server storing content for which permission data is required for reproduction, the method comprising steps of:

retrieving, from the content server, content information that identifies the content server and the content;

generating modified content information that identifies the proxy server and the content identified by the content information;

sending the modified content information to the client;

receiving, from the client, a request for the content identified by the modified content information;

retrieving, from the content server identified by the content information identifying the requested content, permission server information that identifies a permission server capable of creating the permission data for the requested content, wherein said step of retrieving sends, to the content server, proxy server information that identifies the proxy server;

sending the content information to the client as a response to the request for the content;

receiving, from the client, a request for the permission data for the requested content;

retrieving the requested permission data from the permission server; and sending the requested permission data to the client as a response to the request for the permission data.

According to a third aspect of the present invention, there is provided a content server that stores content for which permission data is required for reproduction and that is capable of communicating with a proxy server and a client, the content server comprising:

a content information sending unit that sends, to the proxy server, content information that identifies the content server and the content;

a permission server information request receiving unit that receives, from the proxy server, a request for permission server information that identifies a permission server capable of creating the permission data for the content, the request containing proxy server information that identifies the proxy server;

a permission server information sending unit that sends the permission server information to the proxy server as a response to the request for the permission server information;

a content request receiving unit that receives, from the client, a request for the content; and a proxy server information sending unit that sends, to the client, the proxy server information as a response to the request for the content.

According to a fourth aspect of the present invention, there is provided a method for controlling a content server that stores content for which permission data is required for reproduction and that is capable of communicating with a proxy server and a client, the method comprising steps of:

sending, to the proxy server, content information that identifies the content server and the content;

receiving, from the proxy server, a request for permission server information that identifies a permission server capable of creating the permission data for the content, the request containing proxy server information that identifies the proxy server;

sending the permission server information to the proxy server as a response to the request for the permission server information;

receiving, from the client, a request for the content; and sending, to the client, the proxy server information as a response to the request for the content.

The main advantage of the present invention is as follows. According to the present invention, the proxy server that is capable of retrieving a user identity intercepts acquisition of content and permission data. Accordingly, the acquisition of content and permission data can be associated with the user identity efficiently, and it becomes easier for a network operator to charge for the acquisition on behalf of content providers.

Further features of the present invention will become apparent from the following description of exemplary embodiments with reference to the attached drawings, in which like reference characters designate the same or similar parts throughout the figures thereof.

BRIEF DESCRIPTION OF DRAWINGS

FIG. 4 is a functional block diagram of a content server according to the embodiment of the present invention;

FIG. 5 is a sequence diagram illustrating a procedure according to the embodiment of the present invention.

FIG. 6 is a sequence diagram illustrating a procedure that follows FIG. 5;

FIG. 7 illustrates an XML schema of a Rights Object Acquisition Protocol (ROAP) Trigger.

DETAILED DESCRIPTION

Embodiments of the present invention will now be described with reference to the attached drawings. Each embodiment described below will be helpful in understanding a variety of concepts from the generic to the more specific.

It should be noted that the technical scope of the present invention is defined by the claims, and is not limited by each embodiment described below. In addition, not all combinations of the features described in the embodiments are always indispensable for the present invention.

Figure 1:
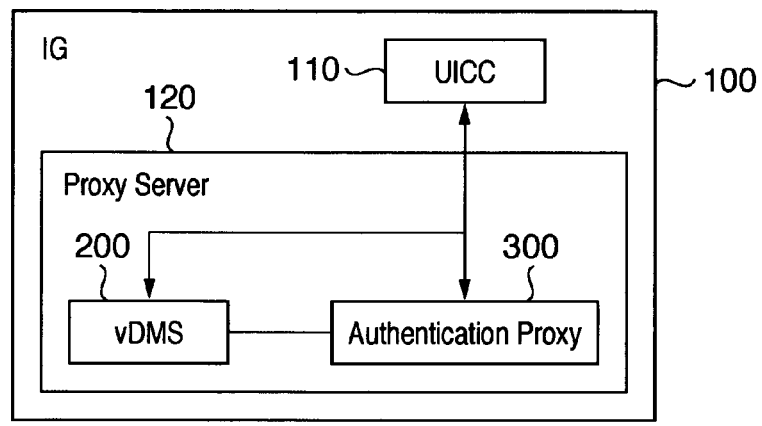
FIG. 1 illustrates an overview of an IP Multimedia Subsystem (IMS) Gateway (IG) according to an embodiment of the present invention.

FIG. 1 illustrates an overview of an IG 100 according to an embodiment of the present invention. The IG 100 comprises a Universal Integrated Circuit Card (UICC) 110 that stores IMS subscription information such as an IMS Private User Identity (IMPI). The UICC 110 is removable from the IG 100.

The IG 100 also comprises a proxy server 120. The proxy server 120 comprises a vDMS 200 and an authentication proxy 300. The proxy server 120 (more specifically, the vDMS 200 and the authentication proxy 300) is capable of communicating with a client such as a DMP via, for example, a UPnP network. Moreover, the proxy server 120 is capable of communicating with a content server via, for example, an IMS network with support from IMS functionality of the IG 100. Alternatively, the proxy server 120 may communicate with a content server via the Internet without support from the IG 100.

Figure 2:
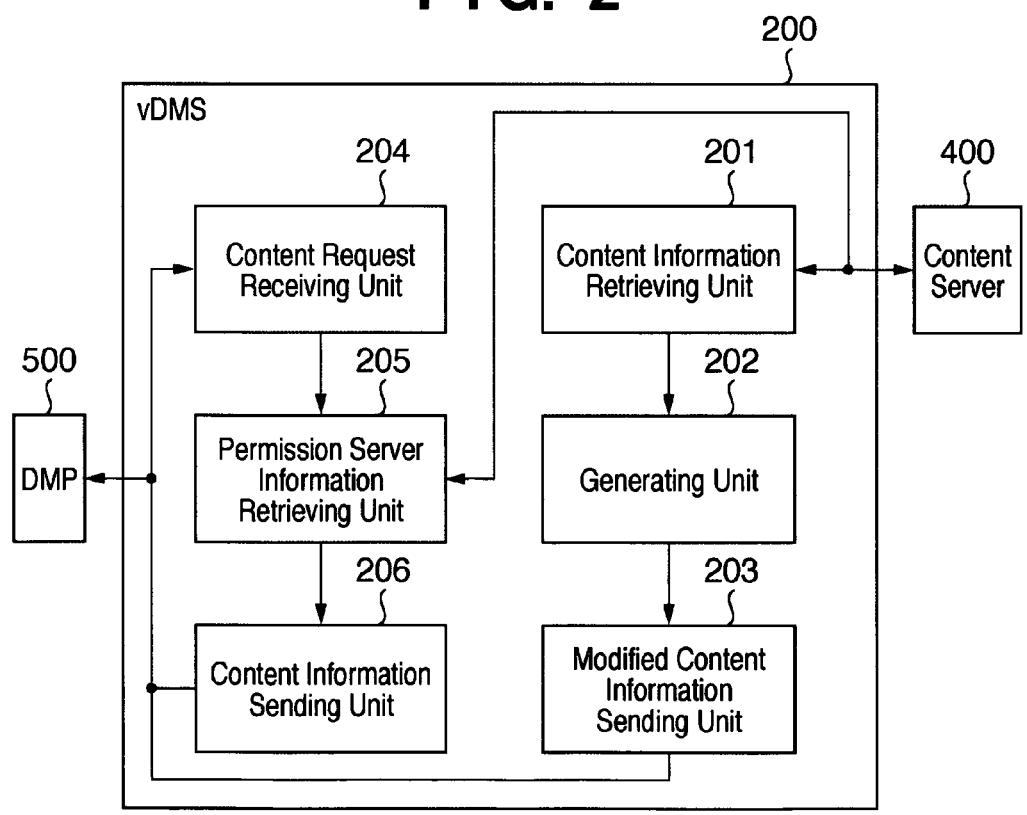
FIG. 2 is a functional block diagram of a virtual Digital Media Server (vDMS) according to the embodiment of the present invention.
Figure 3:
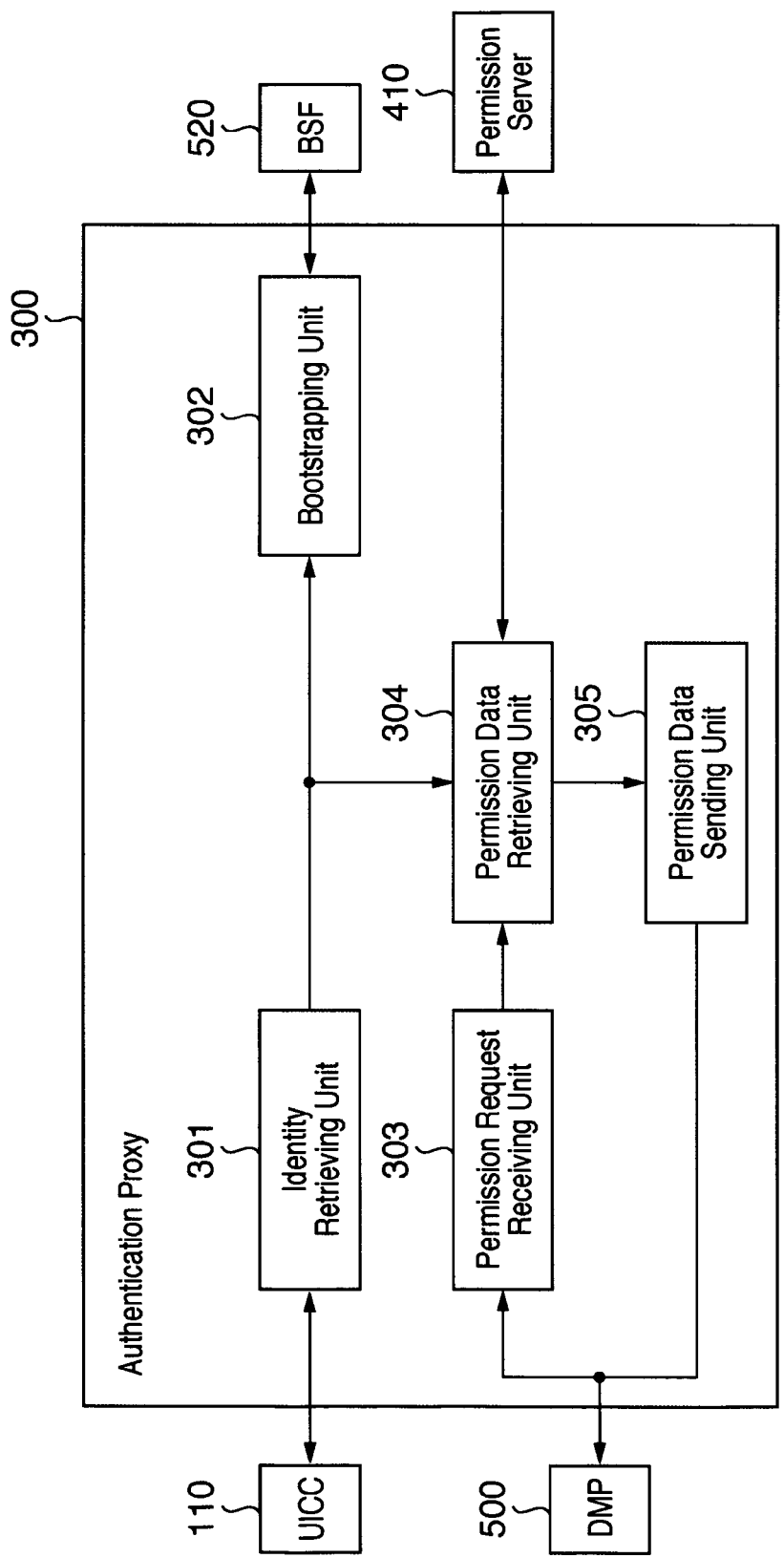
FIG. 3 is a functional block diagram of an authentication proxy according to the embodiment of the present invention.

FIGS. 2 and 3 are functional block diagrams of the vDMS 200 and the authentication proxy 300, respectively. The operations of each block in the vDMS 200 and the authentication proxy 300 will be described later with reference to the sequence diagrams of FIGS. 5, 6, and 8. It should be noted that the functionality of each block in the vDMS 200 and the authentication proxy 300 may be implemented by dedicated hardware, software executed by a processor (not shown) or a combination thereof.

FIG. 4 is a functional block diagram of a content server 400 according to the embodiment of the present invention. The content server 400 is capable of communicating with the proxy server 120 (more specifically, the vDMS 200 and the authentication proxy 300) via, for example, an IMS network with support from IMS functionality of the IG 100. Moreover, the content server 400 is capable of communicating with a client such as a DMP via, for example, the Internet. Furthermore, the content server 400 stores content protected by means of a DRM technology such as OMA DRM 2.0. In other words, permission data such as an RO is required for reproduction of the content stored in the content server 400.

In FIG. 4, the content server 400 comprises a permission server 410, which is capable of creating ROs. However, the permission server 410 may be located separately from the content server 400, as long as it can be accessed from the proxy server 120 (more specifically, the authentication proxy 300). The permission server 410 acts as a Generic Bootstrapping Architecture (GBA) Network Application Function (NAF), which is known to a person skilled in the art through, for example, 3GPP TS33.220 V7.3.0 (2006-03). In addition, the authentication proxy 300 acts as a GBA client. Accordingly, a communication channel between the permission server 410 and the authentication proxy 300 can be protected by GBA. In an alternative embodiment, the permission server 410 is located behind a GBA Authentication Proxy server, which is known to a person skilled in the art through, for example, 3GPP TS33.222 V7.1.0 (2006-03), and it is not necessary for the permission server 410 to act as a GBA NAF.

The operations of each block in the content server 400 will be described later with reference to sequence diagrams of FIGS. 5, 6, and 8. It should be noted that the functionality of each block in the content server 400 may be implemented by dedicated hardware, software executed by a processor (not shown) or a combination thereof.

FIG. 5 is a sequence diagram illustrating a procedure according to the embodiment of the present invention. In the present embodiment, it is assumed that a DMP 500, which is equipped with UPnP functionality, obtains content from the content server 400. The DMP 500 comprises a DRM agent 501, which obtains ROs from the permission server 410 so as to reproduce protected content.

In step S501, the identity retrieving unit 301 of the authentication proxy 300 (see FIG. 3) retrieves a user identity that identifies a user of the proxy server 120. In the present embodiment, the user identity is an IMPI and retrieved from the UICC 110.

In step S502, the bootstrapping unit 302 performs bootstrapping procedure with a Bootstrapping Server Function (BSF) 520 using the IMPI. As a result of the bootstrapping procedure, a Bootstrap Transaction Identifier (B-TID) is shared between the authentication proxy 300 and the BSF 520.

In step S503, the DMP 500 executes a UPnP discovery to discover the vDMS 200.

In step S504, the DMP 500 sends a UPnP CDS::browse request to the vDMS 200.

In step S505, the content information retrieving unit 201 of the vDMS 200 (see FIG. 2) sends, through the IMS network 510 to the content server 400, a SIP SUBSCRIBE message that requests a content list of the content server 400. The SIP SUBSCRIBE message is eventually received by the content information sending unit 401 of the content server 401 (see FIG. 4). Note that the content server 400 can securely identify a source of the SIP SUBSCRIBE message by means of, for example, P-Asserted-Identity or any other identification mechanism agreed between the IMS operator and the content provider operating the content server 400.

In step S506, the content information sending unit 401 sends a SIP NOTIFY message including CDS data (i.e., the content list) to the vDMS 200. The SIP NOTIFY message is eventually received by the content information retrieving unit 201.

In step S507, the generating unit 202 generates a modified content list. In the modified content list, content URLs in the CDS data, which identify (i.e., locate) the content server 400, are altered so that they identify the vDMS 200. For example, if an original content URL is http://ptv.example.com/content-?cid=001, it is altered to http://192.168.1.1:8080/content-?cid=001; "192.168.1.1:8080" is a listening IP address and port of the vDMS 200. This step makes it possible for the vDMS 200 to intercept a request for content by the DMP 500 as described in step S509.

In step S508, the modified content information sending unit 203 sends the modified content list to the DMP 500.

In step S509, the DMP 500 sends an HTTP GET message to one of the content URLs in the modified content list, which is selected by, for example, a user of the DMP 500. The content request receiving unit 204 receives the HTTP GET message as a request for the selected content item.

In step S510, the permission server information retrieving unit 205 sends a SIP INVITE message to the content server 400. The SIP INVITE message contains QoS parameters, the requested content URL before modification (e.g., http://ptv.example.com/content?cid=001), and a URL of the authentication proxy 300 (e.g., http://192.168.1.1:7070/auth_proxy?sid=123); "sid=123" is a session identifier. It should be noted that the permission server information retrieving unit 205 can recognize the original content URL because both the original content URL and the modified content URL identify the same content item by means of "cid=001". The SIP INVITE message is eventually received by the permission server information request receiving unit 402 of the content server 400. The permission server information request receiving unit 402 stores the received URL of the authentication proxy 300 in association with the current content delivery session identified by, for example, a session identifier such as "session=456" assigned by the content server 400.

In step S511, the permission server information sending unit 403 sends a 200 OK message to the vDMS 200. The 200 OK message contains QoS parameters, a Rights Object Acquisition Protocol (ROAP) URL that identifies the permission server 410 which is capable of creating an RO for the content item identified by the content URL in the SIP INVITE message (e.g., http://ro.example.com/roap?session=456), and a content URL indicating the content location associated with the content delivery session identified by "session=456" to which the DMP 500 is redirected later in step S512 (e.g., http://ptv.example.com/content?cid=001&session=456).

The 200 OK message is eventually received by the permission server information retrieving unit 205 of the vDMS 200. The permission server information retrieving unit 205 stores the received ROAP URL in association with the session identifier "sid=123" so that the authentication proxy 300 can identify this received ROAP URL later (step S603 of FIG. 6).

In step S512, the content information sending unit 206 sends a 302 Redirection message to the DMP 500 as a response to the request of step S509. The 302 Redirection message contains the content URL received in step S511 (i.e., http://ptv.example.com/content?id=001&session=456).

In step S513, the DMP 500 sends an HTTP GET message to the content URL received in step S512. The HTTP GET message is eventually received by the content request receiving unit 404 of the content server 400.

FIG. 6 is a sequence diagram illustrating a procedure that follows FIG. 5.

In step S601, the proxy server information sending unit 405 sends a 200 OK message to the DMP 500 as a response to the HTTP GET message of step S513. The 200 OK message is in the form of multipart/related. One entity of the 200 OK message is a DCF content item and the other entity is a ROAP Trigger (an XML schema of which is shown in FIG. 7) for use in RO acquisition. In the present embodiment, a ROAP URL contained in the ROAP Trigger is the URL of the authentication proxy 300 received in step S510 (i.e., http://192.168.1.1:7070/auth_proxy?sid=123). It should be noted that the proxy server information sending unit 405 can recognize the ROAP URL which should be sent because the HTTP GET message of step S513 contains a session identifier (e.g., "session=456") and the session identifier is associated with the ROAP URL in step S510. The 200 OK message is eventually received by the DRM agent 501 of the DMP 500.

In step S602, the DRM agent 501 sends an HTTP POST message to the ROAP URL contained in the ROAP Trigger of step S601. The HTTP POST message contains a RORequest, which requests for the RO specified by the ROAP Trigger. The HTTP POST message is eventually received by the permission request receiving unit 303 of the authentication proxy 300 (see FIG. 3).

In step S603, the permission data retrieving unit 304 forwards the HTTP POST of the RORequest to the permission server 410 identified by the ROAP URL received in step S511 together with the B-TID obtained in step S502 and an authentication information associated with the B-TID. The HTTP POST message is eventually received by the permission request receiving unit 411 of the permission server 400. It should be noted that the permission data retrieving unit 304 can identify the permission server 410 because the HTTP POST message of step S602 contains the session identifier (i.e., "sid=123"), which is associated with the ROAP URL that identifies the permission server 410 in step S511.

In step S604, the permission request receiving unit 411 authenticates the authentication proxy 300 based on one of the defined mechanisms for GBA Ua authentication defined by 3GPP TS24.109 V7.3.0 (2006-06). For example, the permission request receiving unit 411 verifies the authentication information and the B-TID received in step S603 by inquiring the BSF 520. This authentication enables the permission server 410 to associate the RO acquisition with the IMPI of the IG 100 in a trusted and secure manner. Accordingly, it becomes easier for the IMS operator of the IMS network 510 to charge for the RO acquisition on behalf of the content provider. In step S604, permission request receiving unit 411 also authenticates the source of the RORequest (i.e., the DMP 500) based on the digital signature and device certificate attached to the RORequest.

In step S605, the permission data sending unit 412 sends, by use of a HTTP 200 OK message, a ROResponse that contains the requested RO to the authentication proxy 300 as a response to the request of step S603. The 200 OK message is eventually received by the permission data retrieving unit 304. It should be noted that the permission data sending unit 412 may not send the RO if the authentication of step S604 fails.

In step S606, the permission data sending unit 305 forwards the ROResponse to the DRM agent 501.

In step S607, the DMP decrypts the DCF content by using a content encryption key in the RO and starts reproduction of the content.

In the present embodiment, it is assumed that a DCF content item and an RO are separately delivered in step S601 and S606. However, the content server 400 may be configured to deliver the DCF content item and the RO together.

Figure 8:
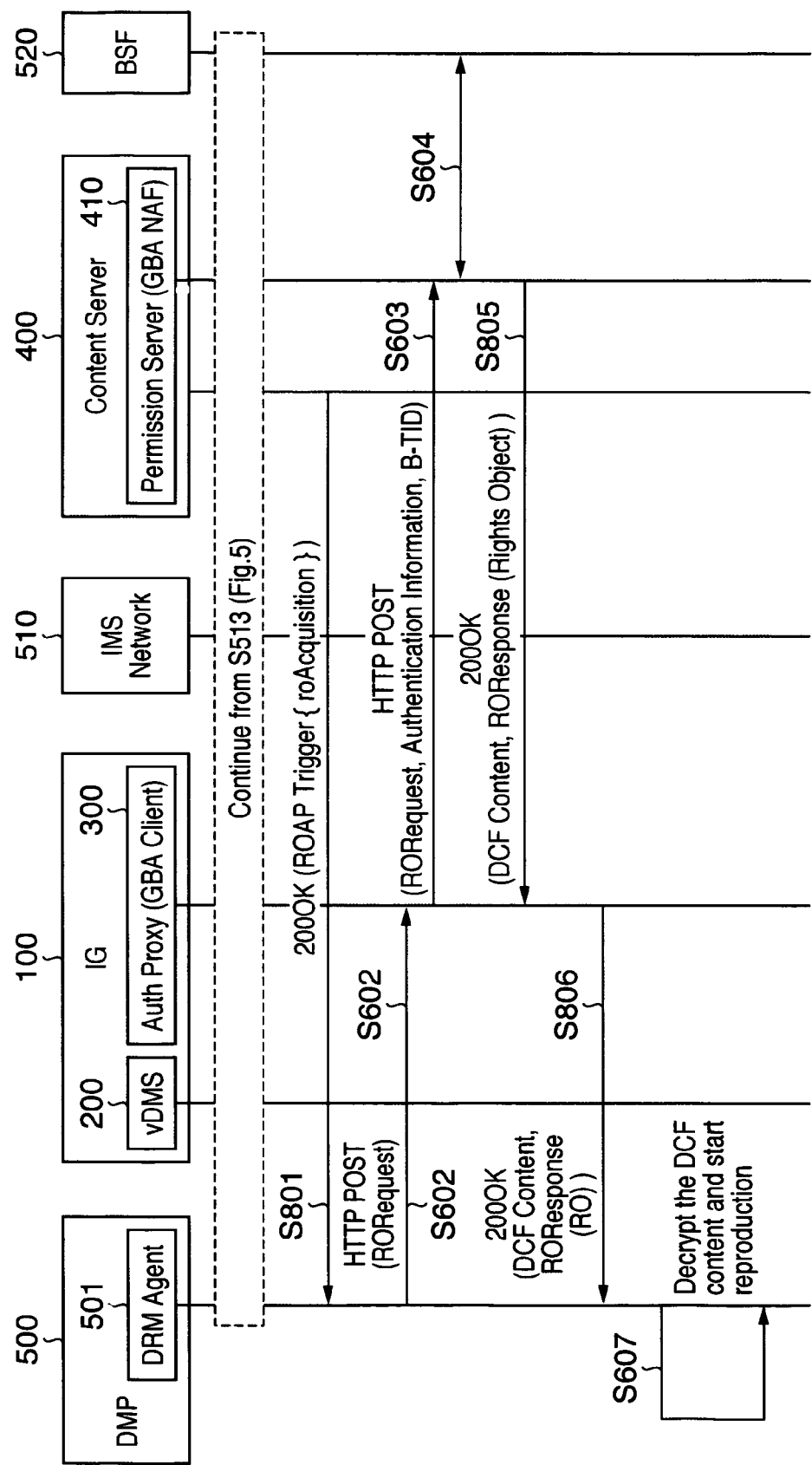
FIG. 8 is a sequence diagram illustrating an alternative procedure that corresponds to FIG. 6.

FIG. 8 is a sequence diagram illustrating an alternative procedure that corresponds to FIG. 6. In FIG. 8, steps in which the same operations are performed as those in FIG. 6 have the same reference numerals as steps in FIG. 6, and a description thereof is omitted.

In step S801, different from step S601, the 200 OK message does not contain a DCF content.

In steps S805 and S806, the HTTP 200 OK message contains a DCF content that is requested in step S513 in addition to an RO.

In the above embodiments, it is assumed that the proxy server 120 communicates with the content server 400 via the IMS network 510. However, the proxy server 120 may communicate with the content server 400 via the Internet, without going through the IMS network 510. In this case, the IG 100 is not necessary to implement the present invention as long as the proxy server 120 can retrieve a user identity such as an IMPI in step S501. Moreover, message types are modified accordingly; for example, the SIP messages of steps S505, S506, S510, and S511 can be HTTP messages while these HTTP messages may be authenticated through GBA in the same manner as steps S603 and S604 where necessary. Even if the IMS network 510 does not involve communication between the proxy server 120 and the content server 400, the content server 400 (more specifically, the permission server 410) can associate the RO acquisition with the IMPI because the B-TID, which is associated with the IMPI, is received in step S603 of FIG. 6 or FIG. 8.

Advantages of the Present Invention

According to the present invention, as described above with reference to various embodiments, the proxy server that is capable of retrieving a user identity intercepts acquisition of content and permission data. Accordingly, the acquisition of content and permission data can be associated with the user identity efficiently, and it becomes easier for a network operator to charge for the acquisition on behalf of content providers.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A proxy server configured to communicate with a client and a content server storing content for which permission data is required for reproduction, the proxy server comprising:
   a content information retrieving unit configured to retrieve, from the content server, content information that identifies the content server and the content;
   a generating unit configured to generate modified content information that identifies the proxy server and the content identified by the content information;
   a modified content information sending unit configured to send the modified content information to the client;
   a content request receiving unit configured to receive, from the client, a request for the content identified by the modified content information;
   a permission server information retrieving unit configured to retrieve, from the content server identified by the content information identifying the requested content, permission server information that identifies a permission server configured to create the permission data for the requested content, wherein the permission server information retrieving unit is further configured to send, to the content server, proxy server information that identifies the proxy server;
   a content information sending unit configured to send the content information to the client in response to the request for the content;
   a permission request receiving unit configured to receive, from the client, a request for the permission data for the requested content;
   a permission data retrieving unit configured to retrieve the requested permission data from the permission server; and
   a permission data sending unit configured to send the requested permission data to the client in response to the request for the permission data.

2. The proxy server according to claim 1, wherein:
the permission server information retrieving unit is further configured to send identification information to the content server and maintain the identification information in association with the retrieved permission server information;
the request for the permission data includes the identification information; and
the permission data retrieving unit is further configured to identify the permission server, from which the requested permission data is retrieved, based on the permission server information associated with the identification information.

3. The proxy server according to claim 1, further comprising an identity retrieving unit configured to retrieve, from a memory, a user identity that identifies a user of the proxy server, wherein the permission data retrieving unit is further configured to send authentication information derived from the user identity.

4. The proxy server according to claim 3, further comprising:
a bootstrapping unit configured to receive, from an authentication server, an authentication identifier associated with the user identity and shared with the authentication server,
wherein the permission data retrieving unit is further configured to generate the authentication information associated with the authentication identifier associated with the user identity.

5. The proxy server according to claim 4, wherein:
the user identity comprises an IP Multimedia Subsystem Private User Identity;
the authentication server comprises a Bootstrapping Server Function; and
the authentication identifier comprises a Bootstrap Transaction Identifier.

6. The proxy server according to claim 1, wherein:
the proxy server is configured to communicate with the client via a Universal Plug and Play network; and
the proxy server is configured to communicate with the content server via the Internet or an IP Multimedia Subsystem network.

7. A method for controlling a proxy server configured to communicate with a client and a content server storing content for which permission data is required for reproduction, the method comprising:
retrieving, from the content server, content information that identifies the content server and the content;
generating modified content information that identifies the proxy server and the content identified by the content information;
sending the modified content information to the client;
receiving, from the client, a request for the content identified by the modified content information;
retrieving, from the content server identified by the content information identifying the requested content, permission server information that identifies a permission server configured to create the permission data for the requested content, and sending, to the content server, proxy server information that identifies the proxy server;
sending the content information to the client in response to the request for the content;
receiving, from the client, a request for the permission data for the requested content;
retrieving the requested permission data from the permission server; and
sending the requested permission data to the client in response to the request for the permission data.

8. The method according to claim 7, wherein:
retrieving the permission server information further comprises sending identification information to the content server and maintaining the identification information in association with the retrieved permission server information;
the request for the permission data contains the identification information; and
retrieving the requested permission data further comprises identifying the permission server, from which the requested permission data is retrieved, based on the permission server information associated with the identification information.

9. The method according to claim 7, further comprising:
retrieving, from a memory, a user identity that identifies a user of the proxy server,
wherein said step of retrieving the requested permission data sends authentication information derived from the user identity.

10. The method according to claim 9, further comprising:
receiving, from an authentication server, an authentication identifier associated with the user identity and shared with the authentication server,
wherein retrieving the requested permission data further comprises generating the authentication information associated with the authentication identifier associated with the user identity.

11. The method according to claim 10, wherein:
the user identity comprises an IP Multimedia Subsystem Private User Identity;
the authentication server comprises a Bootstrapping Server Function; and
the authentication identifier comprises a Bootstrap Transaction Identifier.

12. The method according to claim 7, further comprising:
communicating between the proxy server and the client via a Universal Plug and Play network; and
communicating between the proxy server and the content server via the Internet or an IP Multimedia Subsystem network.

13. A content server configured to store content for which permission data is required for reproduction and to communicate with a proxy server and a client, the content server comprising:
a content information sending unit configured to send, to the proxy server, content information that identifies the content server and the content;
a permission server information request receiving unit configured to receive, from the proxy server, a request for permission server information that identifies a permission server configured to create the permission data for the content, the request including proxy server information that identifies the proxy server;
a permission server information sending unit configured to send the permission server information to the proxy server in response to the request for the permission server information;
a content request receiving unit configured to receive, from the client, a request for the content; and
a proxy server information sending unit configured to send, to the client, the proxy server information in response to the request for the content.

14. The content server according to claim 13, wherein:
the request for the permission server information includes identification information associated with the proxy server information contained in the request; and
the proxy server information sending unit is further configured to send the identification information to the client.

15. The content server according to claim 13, further comprising:
the permission server;
a permission request receiving unit configured to receive, from the proxy server, a request for the permission data for the requested content; and
a permission data sending unit configured to send, to the proxy server, the requested permission data in response to the request for the permission data.

16. The content server according to claim 15, wherein:
the permission request receiving unit is further configured to receive authentication information from the proxy server, and verify the authentication information by inquiring an authentication server; and
the permission data sending unit is configured to send the requested permission data if the authentication information is valid.

17. The content server according to claim 13, wherein:
the proxy server information sending unit is further configured to send the requested content to the client.

18. The content server according to claim 13, wherein:
the content server is configured to communicate with the proxy server via the Internet or an IP Multimedia Subsystem network; and
the content server is configured to communicate with the client via the Internet.

19. A method for controlling a content server configured to store content for which permission data is required for reproduction and that is configured to communicate with a proxy server and a client, the method comprising:
sending, to the proxy server, content information that identifies the content server and the content;
receiving, from the proxy server, a request for permission server information that identifies a permission server configured to create the permission data for the content, the request containing proxy server information that identifies the proxy server;
sending the permission server information to the proxy server in response to the request for the permission server information;
receiving, from the client, a request for the content; and
sending, to the client, the proxy server information in response to the request for the content.

20. The method according to claim 19, wherein:
the request for the permission server information includes identification information associated with the proxy server information contained in the request; and
sending the proxy server information comprises sending the identification information to the client.

21. The method according to claim 19, wherein the content server includes the permission server, the method further comprising:
receiving, from the proxy server, a request for the permission data for the requested content; and
sending, to the proxy server, the requested permission data in response to the request for the permission data.

22. The method according to claim 21, wherein:
receiving the request for the permission data further comprises receiving authentication information from the proxy server, and verifying the authentication information by inquiring an authentication server; and
sending the permission data further comprises sending the requested permission data if the authentication information is valid.

23. The method according to claim 19, wherein:
sending the proxy server information further comprises sending the requested content to the client.

24. The method according to claim 19, further comprising:
communicating between the content server and the proxy server via the Internet or an IP Multimedia Subsystem network; and
communicating between the content server and the client via the Internet.

* * * * *